(12) United States Patent
Sandberg et al.

(10) Patent No.: US 10,958,372 B2
(45) Date of Patent: Mar. 23, 2021

(54) RADIO LINK ADAPTATION IN COMMUNICATION SYSTEMS

(71) Applicant: Telefonaktiebolaget LM Ericsson (publ), Stockholm (SE)

(72) Inventors: Sara Sandberg, Luleå (SE); Kristofer Sandlund, Luleå (SE); Magnus Thurfjell, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 119 days.

(21) Appl. No.: 16/082,657

(22) PCT Filed: Mar. 7, 2016

(86) PCT No.: PCT/EP2016/054753
§ 371 (c)(1),
(2) Date: Sep. 6, 2018

(87) PCT Pub. No.: WO2017/152930
PCT Pub. Date: Sep. 14, 2017

(65) Prior Publication Data
US 2019/0097750 A1    Mar. 28, 2019

(51) Int. Cl.
*H04L 1/00* (2006.01)
*H04B 17/336* (2015.01)
*H04B 7/06* (2006.01)

(52) U.S. Cl.
CPC .......... *H04L 1/0003* (2013.01); *H04B 7/063* (2013.01); *H04B 7/0626* (2013.01); *H04B 7/0639* (2013.01); *H04B 17/336* (2015.01); *H04L 1/001* (2013.01); *H04L 1/0015* (2013.01); *H04L 1/0026* (2013.01); *H04L 1/0035* (2013.01)

(58) Field of Classification Search
None
See application file for complete search history.

(56) References Cited

U.S. PATENT DOCUMENTS

| | | | |
|---|---|---|---|
| 7,310,499 B2 | 12/2007 | Magnusson et al. | |
| 8,953,480 B2 | 2/2015 | Alm et al. | |
| 9,025,430 B2 | 5/2015 | Cheng et al. | |
| 2009/0274204 A1 | 11/2009 | Chen et al. | |
| 2013/0301432 A1 | 11/2013 | Hammarwall et al. | |
| 2013/0315153 A1 | 11/2013 | Sebeni et al. | |
| 2014/0050151 A1* | 2/2014 | Riddington | H04L 1/0026 370/328 |

(Continued)

FOREIGN PATENT DOCUMENTS

| | | |
|---|---|---|
| EP | 2385643 A1 | 11/2011 |
| WO | 2013068041 A1 | 5/2013 |
| WO | 2016023575 A1 | 2/2016 |

*Primary Examiner* — Chi H Pham
*Assistant Examiner* — Paul Rivas
(74) *Attorney, Agent, or Firm* — Sage Patent Group

(57) ABSTRACT

Method, preferably implemented in a transmission node (81, 91, 11), for performing link adaptation of a radio link (106, 108, C1), comprising: determining (72) an estimation error of an estimated quality of the radio link (106, 108, C1), adapting (74) a Modulation and/or Coding Scheme, referred to as MCS, decision input value, which is based on the estimated quality of the radio link, by increasing the MCS decision input value if the determined estimation error exceeds a predetermined threshold, selecting (75) a MCS based on the MCS input value as adapted.

17 Claims, 10 Drawing Sheets

(56) References Cited

U.S. PATENT DOCUMENTS

2016/0057647 A1\* 2/2016 Sullivan ................ H04L 1/0019
  370/253
2017/0214494 A1\* 7/2017 Qiang ................... H04L 1/0003

\* cited by examiner

| CQI index | Modulation | Coding rate × 1024 |
|---|---|---|
| 0 | | out of range |
| 1 | QPSK | 78 |
| 2 | QPSK | 120 |
| 3 | QPSK | 193 |
| 4 | QPSK | 308 |
| 5 | QPSK | 449 |
| 6 | QPSK | 602 |
| 7 | 16QAM | 378 |
| 8 | 16QAM | 490 |
| 9 | 16QAM | 616 |
| 10 | 64QAM | 466 |
| 11 | 64QAM | 567 |
| 12 | 64QAM | 666 |
| 13 | 64QAM | 772 |
| 14 | 64QAM | 873 |
| 15 | 64QAM | 948 |

Fig. 3

| MCS Index ($I_{MCS}$) | Modulation ($Q_m$) | Transport block size index ($I_{TBS}$) |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | 16QAM | 9 |
| 11 | 16QAM | 10 |

Fig. 4

RADIO LINK ADAPTATION IN COMMUNICATION SYSTEMS

TECHNICAL FIELD

The present disclosure relates to radio communication systems in particular to cellular radio communication systems such as mobile communication systems.

BACKGROUND

A commonly used practice to reach spectral efficiency in radio communication systems of today is the use of adaptive modulation and/or coding (AMC). When applying AMC in a radio communication system, the modulation and/or coding of data to be transmitted are selected to match the current channel quality, in order to achieve high system throughput and low delay. For example, AMC may be used in both in the uplink (UL) and the downlink (DL).

In LTE (Long Term Evolution), an instantaneous downlink channel quality is estimated by a wireless communication device, based on measurements performed on reference signals transmitted from a base station. From the measurements, a channel quality report, e.g. a Channel Quality Indicator (CQI), is derived and transmitted in the uplink to the base station. Then, a modulation order and/or a coding rate to be used when addressing said wireless communication device, can be selected in the base station, at least partially based on the reported quality of the radio link.

A typical scenario comprising a transmission node 102 and a wireless communication device 104 is disclosed in U.S. Pat. No. 8,953,480 B2. As shown in FIG. 1 the transmission node 102 transmits signals 108 to the wireless communication device 104 in the downlink, and the wireless communication device 104 transmits signals 106 to the transmission node 102 in the uplink. Unwanted signal energy and/or thermal noise, i.e. interference, is illustrated as dashed arrows 110. In the uplink, a channel quality estimate can be obtained from measurements on received wireless communication device transmissions 106. The wireless communication device transmissions 106 may comprise regular data or so called sounding reference symbols. A sounding symbol is a special reference symbol, which is known to the receiver, and is used for channel estimation. The interference 110 experienced in a transmission node 102, e.g. a base station, can be estimated by measuring, in the transmission node 102, the total received power, and then subtracting the power of the desired signal 106. The thus obtained interference estimate may be applied to one or more wireless communication devices in the cell and or coverage area of the transmission node 102, even wireless communication devices which are not currently transmitting. The modulation and/or coding scheme (MCS) to be used in the uplink is then indicated to the respective wireless communication devices in a "grant" message. The grant is transmitted from the transmission node 102 to the wireless communication device 104 and indicates assigned resources and selected MCS.

Since the MCS must be selected prior to the transmission, it is always based on an estimate or prediction of the actual quality of the radio channel during the transmission. More or less advanced schemes can be used in the process of channel quality estimation, but a common strategy is to filter historic channel quality values, and subtract a safety margin, or "back-off", to compensate for the inherent uncertainty of the estimate. The MCS should generally be selected to give high spectral efficiency and low packet delay. Often, a block error rate (BLER) target is given as a guideline of a good trade-off between throughput and delay. Different algorithms based on BLER target are commonly used in communication systems such as High Speed Packet Access (HSPA), where the back-off is typically based on the experienced block error performance. Algorithms based on BLER are typically applied as an outer-loop, adjusting a back-off margin, set by a relatively fast inner-loop, based on e.g. CQI. An example of such an outer-loop algorithm, which is commonly used, is the so called "jump algorithm", which is further described e.g. in the patent document U.S. Pat. No. 7,310,499.

SUMMARY

One of the drawbacks of the outer-loop solution is that it converges slowly and requires a large number of transmissions in order to obtain sufficiently good statistics. Consequently, it is a problem that the above described estimation and adjustment of a link adaptation (LA) is slow, which has a negative effect on the efficiency in radio link resource utilization, especially at low to medium traffic loads.

Furthermore, Signal-to-Interference-and-Noise-Ratio (SINR) errors that are not accounted for make the link adaptation suboptimal and the throughput is reduced compared to if SINR was perfectly estimated. In particular in the case when the SINR error varies rapidly throughput may be reduced significantly and due to the selected (too conservative) MCS.

It is thus an object to mitigate these drawbacks and to improve the link adaption mechanism.

According to a first aspect a method, preferably implemented in a transmission node, for performing link adaptation of a radio link, is proposed, the method comprises determining an estimation error of an estimated quality of the radio link. The method further comprises adapting a Modulation and/or Coding Scheme, referred to as MCS, decision input value, which is based on the estimated quality of the radio link, by increasing the MCS decision input value if the determined estimation error exceeds a predetermined threshold. The method further comprises selecting a MCS based on the MCS decision input value as adapted.

According to a second aspect a transmission node, e.g. an access node, for performing link adaptation of a radio link, is proposed, the transmission node operative to determine an estimation error of an estimated quality of the radio link. The transmission node operative to adapt a Modulation and/or Coding Scheme, referred to as MCS, decision input value, which is based on the quality of the radio link, by increasing the MCS decision input value if the determined estimation error exceeds a predetermined threshold. The transmission node further operative to select a MCS based on the MCS input value as adapted.

According to a third aspect a non-transitory computer readable storage medium storing a computer program comprising program instructions is proposed, that, when executed on a processing circuit of a node, cause the processing circuit to perform the method steps according to the first aspect.

According to a fourth aspect use of a wireless communication device in a method according to the first aspect is proposed.

Various other methods and apparatus corresponding to the above aspects are detailed herein, as are additional details and refinements of these aspects. Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 3 shows a table containing an exemplary range of CQI index, modulation and coding rate.

FIG. 4 shows a table containing an exemplary range of modulation and transport block size index.

DETAILED DESCRIPTION

Figure 1:
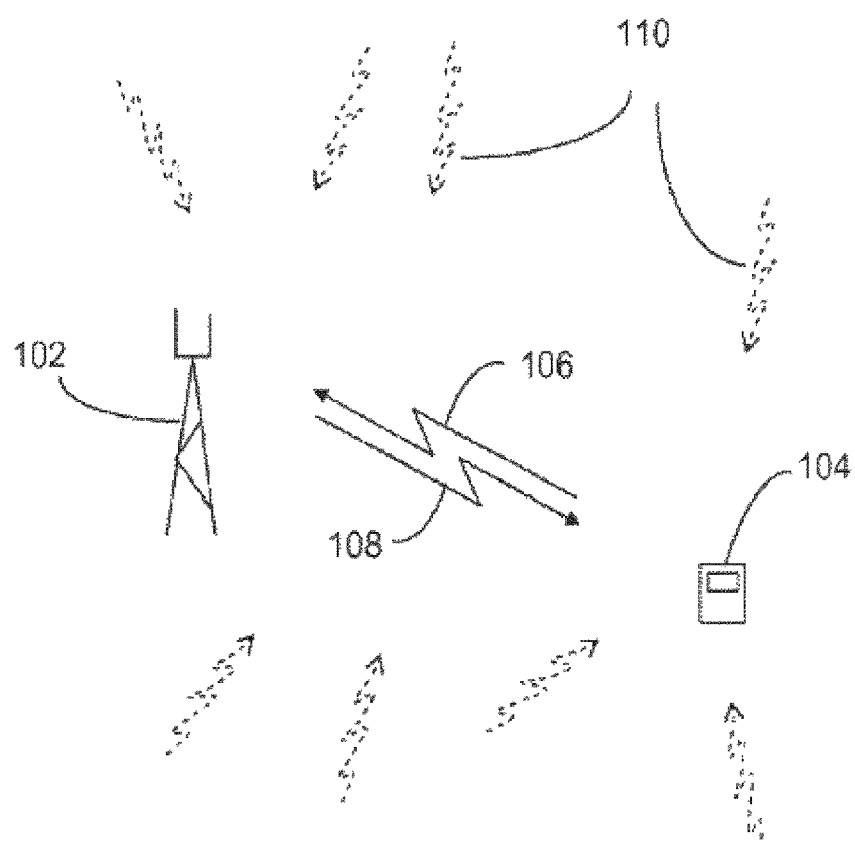
FIG. 1 is a schematic view illustrating a transmission node and a wireless communication device.

The embodiment according to FIG. 1 is described in the above Background section. For situations and embodiments in which the present disclosure may be applied reference is hereby made to that section.

Figure 2:
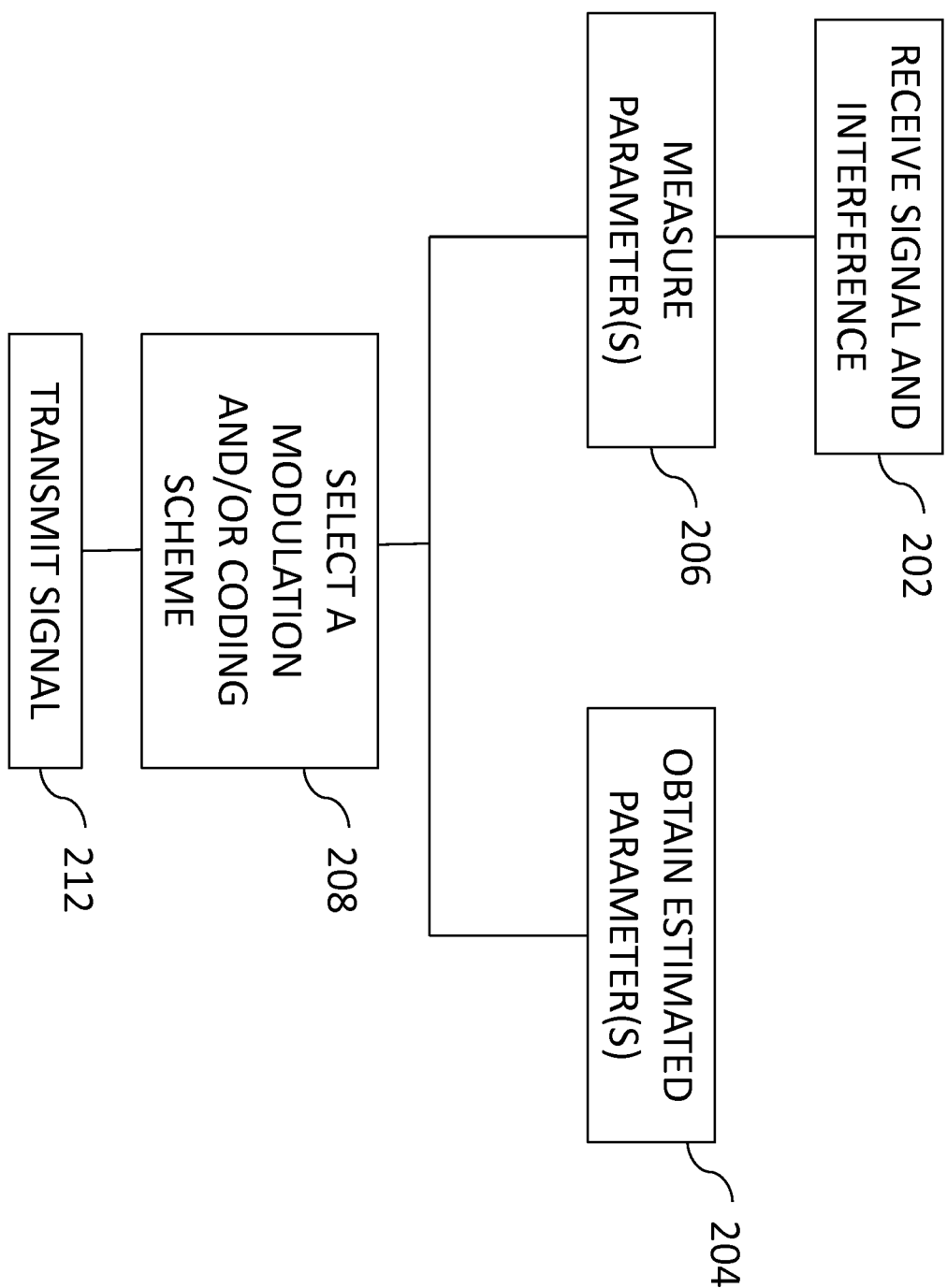
FIG. 2 shows a flow chart illustrating method steps according to an embodiment.

A process generally referred to as link adaptation may be used to select an appropriate modulation and/or coding scheme (MCS) to achieve a target quality of service (QoS) and Block Error Rate (BLER). FIG. 2 shows an embodiment of supporting link adaptation. The steps described hereinafter may preferably be performed by a transmission node such as an access node of a radio access network, e.g. a base station such a NodeB, eNodeB or the like. Initially, a signal transmitted from a wireless communication device and/or interference are received in a step 202. Such a situation may occur as described in connection with FIG. 1. The signal could comprise, e.g. payload data, such as user data, or control data, such as reference signals. Additionally or alternatively, the signal could comprise estimates (of parameters) related to the quality of a radio link. One or more estimates of parameters related to the quality of the radio link, such as e.g. SINR, or received signal strength S and interference I, may be obtained in a step 204. For received signals comprising estimates of one or more parameters related to the quality of the radio link, which may be made in another network entity, such as another transmission node or a wireless communication device, the obtaining in step 204 (only) involves e.g. extracting the desired parameter estimates from the received signal, and for example storing them, e.g. in a memory, for later use. Otherwise, i.e. for other signal contents and interference, the obtaining in step 204 involves estimation, i.e. prediction, of quality related parameters of the radio link, over which the received signal was transmitted. In order to estimate said parameters, the obtaining step should have access to measurements performed on the radio link.

After the reception of a transmission over the radio link, instead or additionally to step 204, measurements of the one or more parameters related to the quality of the radio link may be performed in a step 206, e.g. the SINR, or separately, the signal strength of a signal received over the radio link, and the interference experienced at the transmission node. The interference parameter may be present also when no transmissions from other transmission nodes arrive, and could therefore be measured continuously, e.g. at certain predetermined intervals. The signal strength/gain parameter, on the other hand, could only be measured when receiving a transmission from another transmission node.

The parameter(s) obtained, estimated and/or measured are then provided, either e.g. to a functional unit within the transmission node, or to another transmission node, for use when selecting a MCS that should be used when transmitting over the radio link. Thus, said parameters and the values of said parameters respectively serve as decision input value for selecting a Modulation and/or Coding scheme in step 208. However additional information may be taken into account for determining a MCS decision input value and/or selecting the MCS. As becomes apparent from FIG. 2 steps 202, 206 and step 204 can used in combination with one another. Alternatively, for selecting a MCS in step 208 only steps 202 and 206 may be used. However, selecting an MCS may be base on step 204 only, i.e. without performing additional measurements of parameters in step 206.

Depending on the selection of a MCS within the transmission node, a signal transmitted e.g. to one or more wireless communication devices in step 212 may be modulated and/or coded according to the MCS selected. It is to be understood that the signal transmitted carries data dedicated to one or more wireless communication devices.

There may be variations in how the above procedure is to be implemented in different systems, such as e.g. LTE, WiMAX, WCDMA, due e.g. to differences in how and where the measuring and reporting of channel parameters are implemented, and how and where the modulation and/or coding scheme is selected.

In particular, an aspect of the link adaptation process referred to as outer loop link adaptation may be used by the transmission node to determine an MCS. The link adaptation may be based on a reported CQI (and possibly RI) and/or an estimated DL BLER. The determination and selection of a modulation and/or coding scheme may be based on one or more mapping tables, such as a table mapping CQI to MCS, e.g. as shown in FIG. 3 and/or FIG. 4, and/or a table mapping the effects of changes in RI (Rank Indicator) to a MCS.

The parameter(s) obtained and used as a decision input value for selecting a modulation and coding scheme may for example be a CQI report. Based on one or more CQI reports from a wireless communication device, a transmission node may choose the MCS to transmit data via the radio link, e.g. on the physical downlink shared channel (PDSCH). The range of CQI reports for LTE systems is shown in FIG. 3. The CQI table has been specifically designed to support modulation and/or coding scheme (MCS) adaptation over radio channels. The MCS information may be conveyed to the one or more wireless communication devices in a 5-bit "modulation and coding scheme" field (IMCS) of the downlink control information.

As shown in FIG. 4, the IMCS field signals to the wireless communication device both the modulation and the transport block size (TBS) index. In conjunction with the total number of allocated resource blocks, the TBS index further determines the exact transport block size used in the PDSCH transmission. It is to be understood that the table in FIG. 4 is for exemplary purposes only. For example a full table and further MCS schemes which may be employed in connection with the present invention are described in U.S. Pat. No. 9,025,430 B2.

An exemplary embodiment of a link adaptation making use of a modulation and/or coding scheme (MCS) decision input value may include increasing the MCS decision input value by an offset, such as a CQI offset. For example a CQI offset may be added to the CQI obtained, e.g. in step 204 of FIG. 2. As the CQI is used by the transmission node to estimate SINR, which in turn may be used by the transmission node to select the MCS for signal transmission to one or more wireless communication devices, the transmission node and/or the wireless communication device may modify its measured CQI by a CQI offset. This will in turn affect the MCS which may be selected for data transmission. Accordingly, in an exemplary embodiment, the transmission node may be configured to adapt a MCS decision input value, such as a CQI, in order to select a more aggressive MCS, that is to select a MCS of a higher order.

The selecting step 208 may comprise selecting a first modulation order and a first coding rate, and selecting a second modulation order and a second coding rate, wherein at least one of the second modulation order and the second coding rate differs from the first modulation order and the first coding rate, respectively. The second modulation order may be higher than the first modulation order and the second coding rate may be higher than the first coding rate. The first and the second modulation order and/or coding rate may e.g. be selected from the tables in FIG. 3 and/or FIG. 4. The first modulation order and/or the first coding rate may be the employed before selecting the second modulation order and/or the second coding rate. Selection of the first and/or second modulation order and/or the first and/or second coding rate may for example be based on an estimated quality of the radio link as described in the above. However, additionally or instead other criteria referred to hereinafter as MCS decision input value may be considered when selecting a MCS.

In particular, an estimation error of an estimated quality of the radio link may be performed. The step of determining an estimation error of the (estimated) quality of the radio link may for example be performed after receiving a signal and interference in step 202. Alternatively the step of determining an estimation error may be performed after obtaining and/or measuring a plurality of parameters in steps 204 and 205 respectively. The estimation error determined may then be taken into account when selecting a modulation and/or coding scheme in step 212. For example the determination of the estimation error may be based on a number of subsequently obtained and/or measured parameters and/or a variation between said obtained and/or measured parameters.

In particular, if the determined estimation error exceeds a predetermined threshold the MCS currently selected for transmission may be adapted. In such a case a decision input value on which the selection of the modulation and/or coding scheme is based may be increased in order to select a more aggressive MCS. That is to say the MCS decision input value may be increased in such a way that a higher order MCS is selected.

Figure 5:
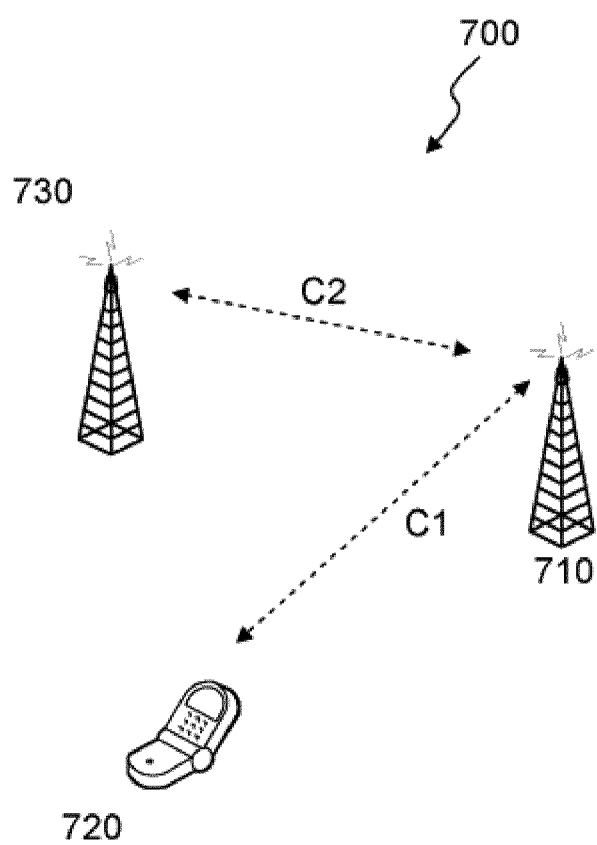
FIG. 5 shows a schematic overview of a further exemplifying radio communication system.

Now referring to FIG. 5, where an exemplifying radio communication system 700 is illustrated. The radio communication system 700 may for example be an LTE system. The radio communication system 700 comprises a first transmission node 710, a wireless communication device 720 and a second transmission node 730. A dashed line C1, provided with an arrow at each end, indicates that the first transmission node 710 and the wireless communication device 720 are configured to be able to communicate with each other. Another dashed line C2, provided with an arrow at each end, indicates that the first transmission node 710 and the second transmission node 730 are configured to be able to communicate with each other.

It is to be understood that the first and the second transmission nodes may adapt its MCS used for communicating with one or more wireless communication devices within the coverage area of the respective transmission node. The respectively selected MCS may be communicated from one transmission node to the other. This is referred to as Coordinated link adaptation (CoLA). By way of CoLA it is possible to use information about the transmission decisions made by one or more neighboring transmission nodes, e.g. in the link-adaptation decision of the first transmission node the transmission decision of the second transmission node may be used. To enable CoLA, multiple CSI processes may be defined allowing for reception of multiple CSI reports corresponding to different hypotheses regarding the transmission decisions of neighboring transmission nodes. These CSI reports can then be used together with information about the actual transmission decisions of neighboring transmission nodes in the link adaptation.

For example in CoLA, transmission decisions from one or more neighboring transmission nodes may be used to improve estimation of SINR. The SINR estimation may use reported CQI from different CSI processes, PMI, RI, receiver capabilities, etc. However, there may be nonetheless some estimation error. If the estimation error is assumed to be small, standard coordinated link adaptation giving around 10% BLER is used. If the estimation error is assumed to be large (e.g. above a predetermined threshold), a SINR offset may be added to the estimated SINR in the MCS selection process, yielding selection of a more aggressive MCS. Multiple CSI processes is only a way to get multiple CQI, PMI, and/or RI. It could also be the case CQI, PMI, and/or RI are received subsequently for the same CSI process. The CSI processes preferably relate to a wireless communication device connected to the first or second (i.e. neighboring) transmission node.

Thus for example at least one of the following steps may be performed, in particular by one or more transmission nodes 710, 730 and/or in each TTI respectively:

Receive transmission decisions for the following TTI from another transmission node in a coordinated area (of transmission nodes). This may include information about in which frequency subbands a transmission node is transmitting and which precoder and/or which rank is used as well as which RSRP is used.

Receive one or more CQI reports for at least one hypothesis regarding the transmission decisions of one or more neighboring transmission nodes.

Estimate a SINR based on information received e.g. according to at least one of the preceding steps.

Estimate an estimation error of the estimated SINR.

Determine if the estimation error is above a threshold set.

Add an offset to the SINR.

Select the MCS based on the adapted SINR.

It should be understood that instead of the SINR any other MCS decision input value may be determined and used for selecting the MCS, such as e.g. any of the parameters mentioned in the above, especially in connection with FIG. 2.

For example, if a CQI report for a hypothesis according to which all neighboring transmission nodes are transmitting is available, a RSRP (Reference Signal Received Power) received may be used to adjust the CQI report if some interferers are actually turned off in a considered TTI. However, this will most likely, and especially if the interferers, such as one or more neighboring transmission nodes, that are actually turned off are strong interferers, result in an estimation error that is larger than if also a CQI report for the hypothesis corresponding to the case with at least one of the interferers turned off was available.

The aim of the error estimation, as mentioned in the above, is to decide if the estimated quality of the radio channel, such as the SINR estimated, is so accurate that link adaptation will work well or if a more aggressive MCS should be used to limit throughput losses. Thus, an estimation error based on one or more transmission parameter changes or variations may be determined. Based on the determined estimation error a more aggressive MCS may be selected (will result in a higher average throughput).

A typical SINR offset which may be used to achieve selection of a more aggressive MCS could for example be 10 dB or higher. Of course, as soon as the maximum MCS is reached, further increasing the offset will not affect the MCS and the number of retransmissions. The SINR offset may also be selected based on a delay constraint. The predetermined offset may thus be adjusted based on said delay constraint. That is, the offset may be adapted, e.g. lowered, in order to meet a delay constraint.

If an outer loop link adaptation is used in the link adaptation algorithm it should only count ACK/NACKs from transmissions not using the SINR offset, i.e. transmissions based on the estimated quality of the radio link where the estimation error is below the threshold.

The above embodiment is based on using available information to estimate the SINR estimation error. Of course other information such as any of the parameters mentioned in the above in connection with FIG. 2 may be used to determine a quality of the radio link and/or as a MCS decision input value. Further on, one or more transmission parameters (indicating a transmission decision of one or more of neighboring transmission nodes) may be obtained and used as a decision input value for selecting a MCS. The transmission parameter(s) may be received from one or more transmission nodes in a coordinated transmission cluster, e.g. the CoLA cluster of the transmission node performing link adaptation. The transmission parameter may be one or more of the following: —an on/off information, indicating whether the potential interferer (which may be any one of the above mentioned neighboring transmission nodes) will transmit or not in the TTI, —a rank information for transmitting interferers—a precoder information for transmitting interferers. Other information may be collected from measurements (performed by the transmission node in step 206 of FIG. 2), e.g. RSRP information, CQI reports from multiple CSI processes, RSRP from serving and interfering transmission nodes and/or SINR estimation form different interference hypotheses.

By using and/or combining one or more of the above transmission parameter, the SINR (or a quality of the radio channel in general) predictability can be determined. If the radio channel is found to be unpredictable, i.e. the estimated quality of the radio channel is subject to a certain estimation error, an offset may be added to the MCS decision input value, e.g. in case the estimation error exceeds a predetermined threshold. Thus, a SINR offset may be added to the estimated SINR and the so adapted SINR may be used in the process of link adaptation, for example for selecting a MCS.

The accuracy of the link adaptation, e.g. when determining the estimation error of the estimated quality of the radio link, may be increased by considering additional information about potential interference, e.g. caused by neighboring transmission nodes. Such additional information may affect the MCS decision input value. Hence, determining and/or adapting the decision input value may be based on at least one of the following: —on/off information on potential interferers, —adding RSRP values related to each interferer, —adding rank information related to a serving transmission node and each interferer, —adding precoder information related to serving transmission node and each interferer, —adding fast fading predictability information from well-designed CSI process settings.

In a further exemplary embodiment, the above mentioned on/off information may indicate whether a set of active interferers has changed compared to a TTI (transmission time interval) in which the current CQI report was measured. As a consequence the radio channel may be considered unpredictable and an offset may be added to the MCS decision input value. Instead of adding an offset the MCS input value may be increased in another way.

Furthermore, if there has been a change (on or off) for the strongest interferer or for interferers with RSRP values within a certain distance from the strongest interferer (e.g. 6 dB) the radio channel may be considered unpredictable and an offset may be added to the decision input value.

Still further, if the transmission rank of the serving transmission node or any of the considered interferers has changed the radio channel may be considered unpredictable and an offset may be added to the MCS decision input value.

Still further, if the precoding on serving transmission node or any of the considered interferers has changed the radio channel may be considered unpredictable and an offset may be added to the MCS decision input value.

Still further, a CSI process with a fixed set of interferers with a transmission rank and/or a precoder may be defined. Based thereupon, interference variations (only fast fading variations left) may be collected and a time limit T may be estimated after which the fast fading part of a CQI report is outdated. If a CQI report (based on which the link adaptation and/or the selection of the MCS has been made) the radio channel may be considered unpredictable and an offset may be added to the MCS decision input value As should be clear as is has been described in the above the channel may considered unpredictable if the estimation error (of a quality of the radio link) exceeds a predetermined threshold.

Figure 6:
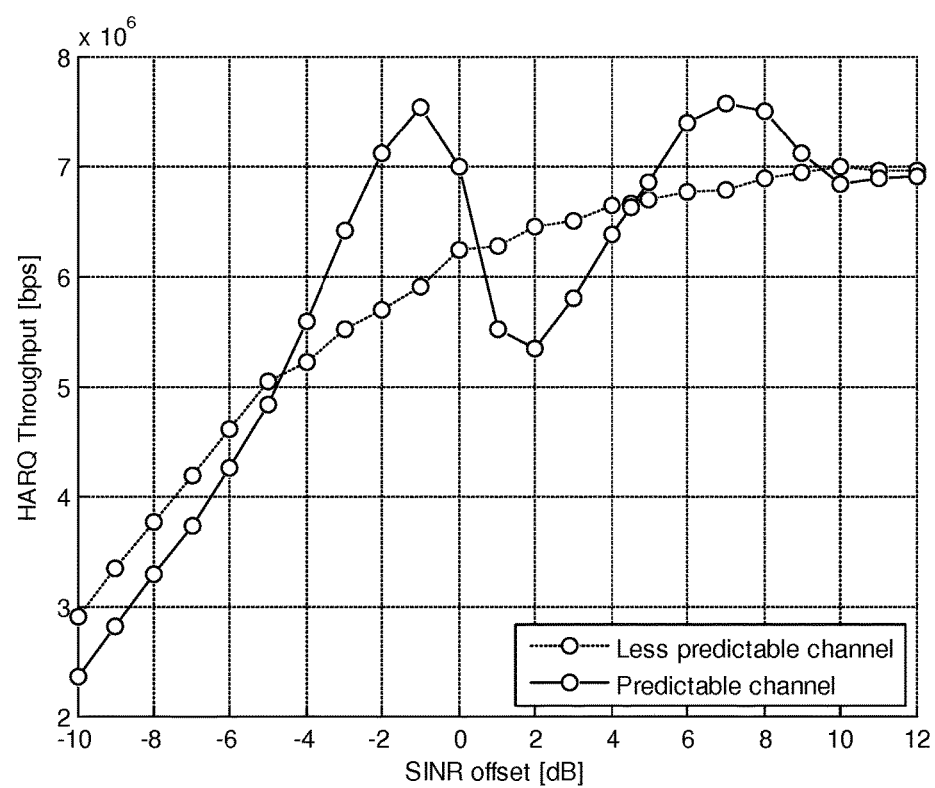
FIG. 6 shows throughput variations as a function of SINR (offset) for two channels with different predictability characteristics.

FIG. 6 shows throughput variations (in bits per second, i.e. bps) as a function of an SINR offset (in decibel, i.e. dB) for channels with different predictability characteristics.

In general, HARQ transmission with incremental redundancy is in general very good and retransmissions are causing little or no throughput loss. For example, if there are only lose delay constraints, for example for file download, targeting a number of retransmissions in general increases the throughput. On the other hand, if by way of the link adaptation a too defensive MCS, i.e. a MCS of lower order, is selected this may result in fewer bits being transferred compared to the optimal MCS, there will be a throughput loss. Such a scenario is shown in FIG. 6.

In case of a predictable radio channel the best throughput, according to the example provided in FIG. 6, is found around the estimated SINR (offset ~0 dB), corresponding to ~10% BLER. Actually, the best throughput would be achieved with an offset of −1 dB. An equally good throughput for the predictable channel may be achieved with a more aggressive MCS selection (SINR offset ~7 dB), where most packets are decoded correctly after the first retransmission. However, for a radio channel that is more difficult to predict (less predictable channel) it may be better to be more aggressive with regard to modulation and/or coding, e.g. use a SINR offset, as can be seen in the example of FIG. 6. As can be seen the throughput of the less predictable channel is increased by adding an offset to the estimated SINR (located at 0 dB offset in FIG. 6). It is thus an advantage that throughput is increased by way of said offset.

Accordingly in an exemplary embodiment effective HARQ transmissions are combined with identification of situations where the SINR estimation error is assumed to be high (above a predetermined threshold). If the SINR estimation error is small (below a predetermined threshold), the link adaptation will work properly and an MCS giving close to the maximum possible throughput will be selected. However, if the error is large, the link adaptation will not work well since the selected MCS will sometimes be too conservative and sometimes too aggressive.

HARQ transmission makes the throughput loss for a too aggressive MCS very small, though at the cost of increased delay. However, if the MCS is too defensive, the resulting throughput loss can never be regained. Thus, if a situation where the SINR estimation error is assumed to be high is detected, the MCS selection is based on the estimated SINR increased by a large a large SINR offset. Such situations may for example be if the CQI reports vary significantly even though they correspond to the same transmission decision hypothesis or if no CQI report corresponding to the current transmission decision is available. With a large SINR offset the selected MCS will on average be more aggressive than for perfect SINR estimation. Hence, when the correct MCS is hard to predict, a large SINR offset is added to select an aggressive coding and rely on HARQ retransmissions.

Figure 7:
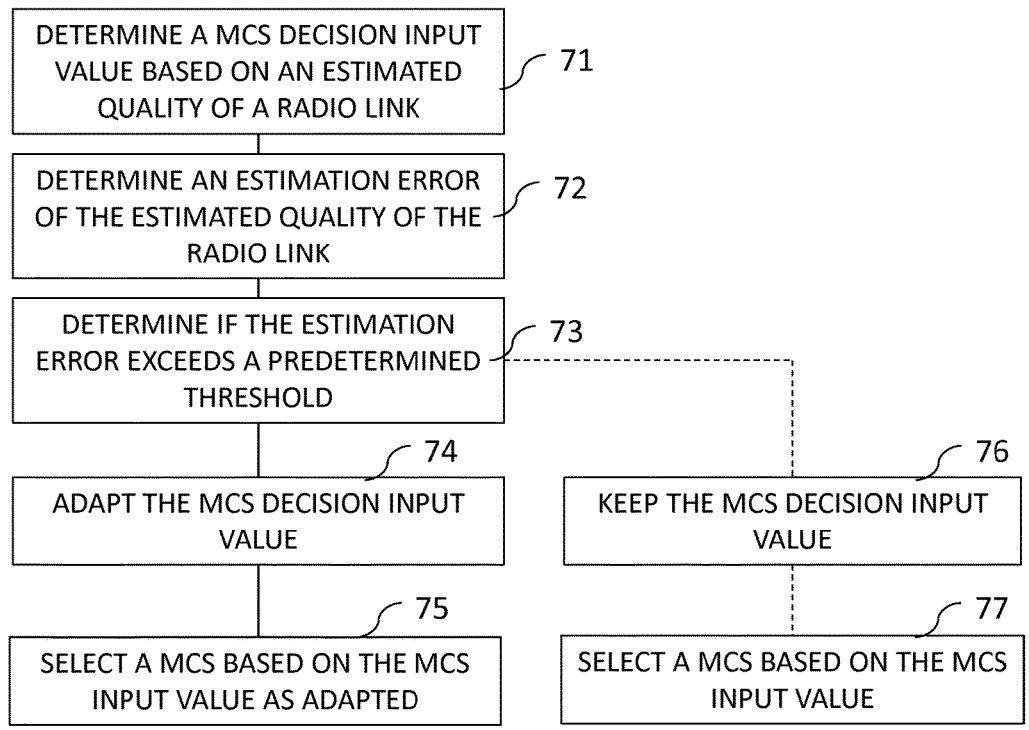
FIG. 7 shows a flow chart illustrating method steps according to an embodiment.

FIG. 7 shows a flow chart illustrating method steps according to an embodiment. As already explained in the above, genuinely a MCS decision input value is determined based on an estimated quality of a radio link, e.g. between a transmission node and a wireless communication device.

In order to improve the link adaptation mechanism an estimation error of the estimated quality of the radio link may be determined. Determining the estimation error may be based on any one of the transmission parameters as mentioned in the above.

Subsequently it may be determined if the estimation error exceeds a predetermined threshold (of the estimation error).

If the estimation error exceeds said threshold, the MCS decision input value may be adapted by increasing the MCS decision input value, e.g. by adding an offset to the MCS decision input value. Consequently, a MCS based on the MCS decision input value as adapted will be selected.

If the estimation error does not exceed said predetermined threshold the MCS decision input value may be kept unadapted (or may even be amended in another way). In such a case a MCS is selected based on the MCS input value, e.g. as originally determined in step 71.

Further exemplary embodiments comprising further method steps are disclosed in the following:

According to a first embodiment the step of adapting the MCS decision input value comprises: adding an offset to the MCS decision input value.

According to a second embodiment the step of determining an estimation error of the estimated quality of the radio link, comprises: estimating a Signal-to-Interference-and-Noise-Ratio (SINR) of the radio link, e.g. based on at least one received Channel Quality Indicator (CQI), and determining an estimation error level of the estimated SINR.

According to a third embodiment adapting the MCS decision input value comprises adding an offset having a predetermined constant value.

According to a fourth embodiment adapting the MCS decision input value comprises adding an offset having a value adapted based on the determined estimation error.

According to a fifth embodiment adapting the MCS decision input value comprises adding an offset which is large enough such that a more aggressive MCS is selected than if the MCS is based on the estimated quality of the radio link.

According to an sixth embodiment a MCS corresponding to the MCS decision input value based on the estimated quality of the radio link is selected if the determined estimation error is below a first predetermined threshold.

According to a seventh embodiment an estimated quality of the radio link based on a transmission decision of at least one neighboring transmission node is determined, e.g. whether the neighboring transmission node is transmitting or not and/or a transmission format of a transmission of the neighboring transmission node.

According to a eighth embodiment an estimation error of the radio link quality based on a transmission decision of a neighboring transmission node is determined, e.g. whether the neighboring transmission node is transmitting or not and/or a transmission format of a transmission, in particular if the transmission format has changed e.g. compared to the transmission format for which the quality of the ratio link has been estimated.

According to an ninth embodiment an estimation error of the radio link quality based on one or more Channel Quality Indicators (CQI), CSI processes, Precoding Matrix Indicators (PMI), Rank Indicators (RI), and/or receiver capabilities is determined.

According to a tenth embodiment an estimation error of the radio link quality based on comparing a plurality of Channel Quality Indicators (CQI) which are created based on the same transmission hypothesis is determined.

According to a eleventh embodiment it is determined whether the number of interferers has changed compared to the number of interferers of the estimated quality of the radio link has been estimated, and whether the estimation error and/or adapting the MCS decision input value if the number of interferers has changed.

According to a twelfth embodiment it is determined whether the power of interference has changed compared to the power of interference for which the quality of the radio link has been determined, and determining the estimation error and/or adapting the MCS decision input value if the power of interference has changed above a predetermined threshold, in particular if the change in the power of interference has exceeded a predetermined threshold.

According to a thirteenth embodiment determining whether a rank indicator, RI, of the transmission node and/or a neighboring transmission node has changed compared to a rank indicator for which the quality of the radio link has been estimated, and determining the estimation error and/or adapting MCS decision input value if the rank indicator has changed.

According to a fourteenth embodiment it is determined whether the precoding matrix indicator of the transmission node and/or a neighboring transmission node has changed compared to the precoding matrix indicator for which the quality of the radio link has been estimated, and determining the estimation error and/or adapting the MCS decision input value if the precoding matrix indicator has changed.

According to a fifteenth embodiment a time limit, T, for which the estimated quality of the radio link is valid, is determined and the estimation error and/or adapting the MCS decision input value is determined if the time limit has elapsed.

According to a sixteenth embodiment the steps of estimating the quality of the radio link, determining the estimation error, adapting the estimated quality of the radio link, and/or selecting the Modulation and Coding Scheme (MCS) are performed for each one of a plurality of successive transmission time intervals (TTI) or a set of transmission time intervals.

Figure 8:
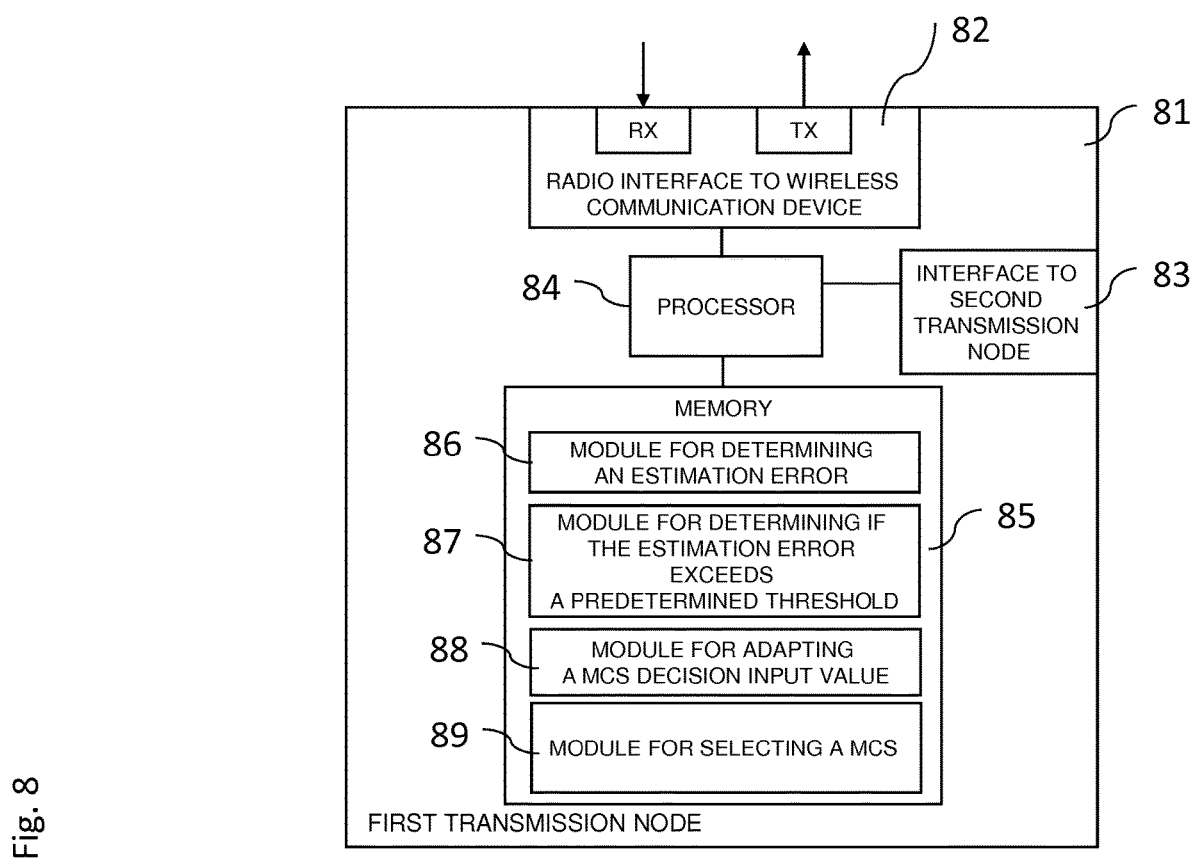
FIG. 8 schematically illustrates exemplary structures of a first transmission node according to an embodiment.

FIG. 8 illustrates exemplary structures which may be used for implementing the above concepts in a first transmission node 81 of radio communication system, e.g., a cellular radio network based on the LTE technology. The first transmission node 81 may for example correspond to an eNB or to some other type of base station.

As illustrated, the first transmission node may include a radio interface 82 for enabling access of one or more wireless communication devices, such as a wireless communication device 104, 720. The radio interface 82 may for example implement the Uu radio interface of the LTE radio technology. As further illustrated, the first transmission node 81 may include a network interface 83 for connecting the first transmission node to other nodes of the cellular radio network, e.g., to other a second transmission node 91 or to nodes of a core network part of the cellular radio network. The network interface 83 may for example implement the X2 and/or S1 interface of the LTE technology.

Further, the first transmission node 81 may include one or more processors 84 coupled to the radio interface and network interface, and a memory 85 coupled to the processor(s). The memory may include a ROM, e.g., a flash ROM, a RAM, e.g., a DRAM or SRAM, a mass storage, e.g., a hard disk or solid state disk, or the like. The memory includes suitably configured program code to be executed by the processor(s) so as to implement the above-described functionalities of a transmission node. In particular, the memory may include various program code modules for causing the first transmission node to perform processes as described above, e.g., corresponding to the method steps of FIG. 2 and/or FIG. 7.

As illustrated, the memory may include a module for determining an estimation error 86. Further, the memory may include a module for determining if the estimation error exceeds a predetermined threshold 87. Further the memory may include a module for adapting a MCS decision input value 88. Further, the memory may include a module for selecting a MCS 89.

It is to be understood that the structures as illustrated in FIG. 8 are merely schematic and that the first transmission node 81 may actually include further components which, for the sake of clarity, have not been illustrated, e.g., further interfaces or processors. Also, it is to be understood that the memory may include further types of program code modules, which have not been illustrated, e.g., program code modules for implementing known functionalities of an eNB or similar access node. According to some embodiments, also a computer program may be provided for implementing functionalities of the first transmission node, e.g., in the form of a physical medium storing the program code and/or other data to be stored in the memory or by making the program code available for download or by streaming. The concepts as described above may be used for efficiently performing link adaptation of one or more wireless communication devices.

Figure 9:
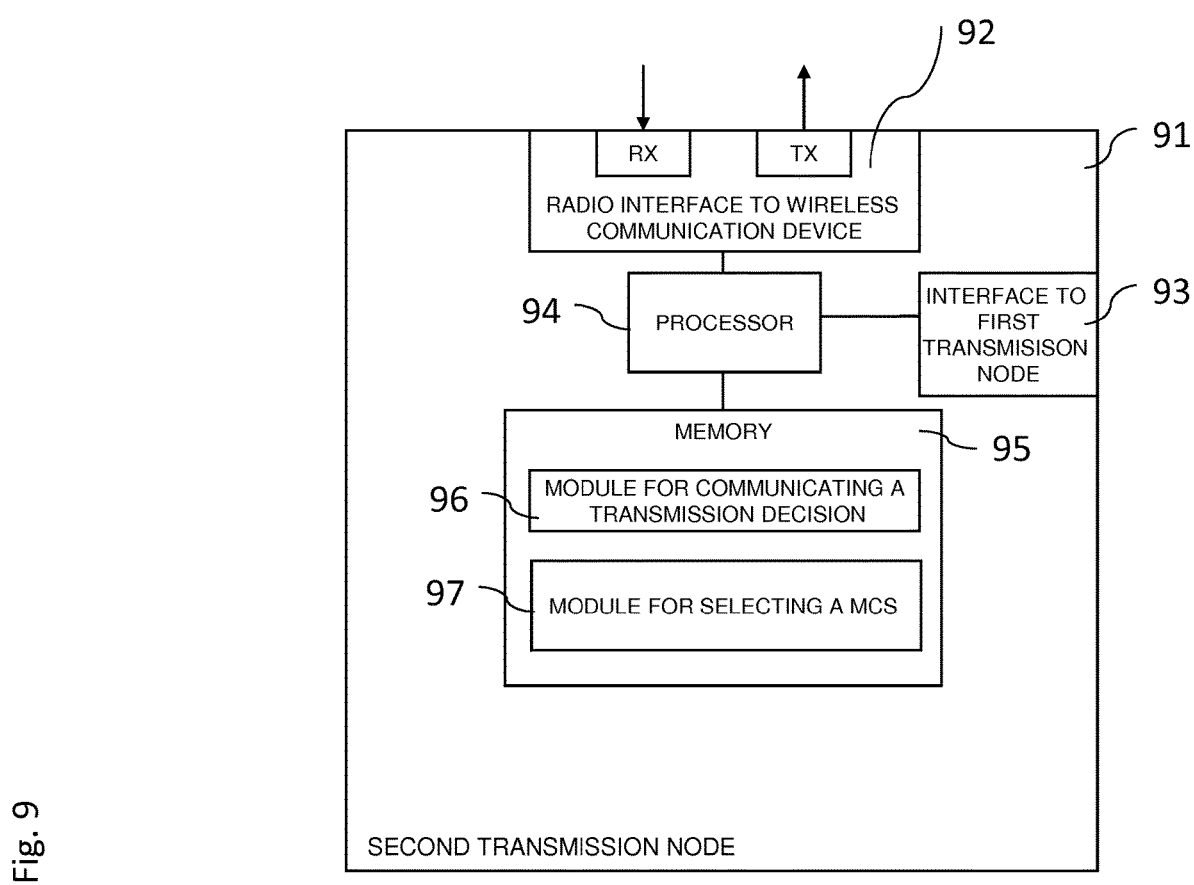
FIG. 9 schematically illustrates exemplary structures of a second transmission node according to an embodiment.

FIG. 9 illustrates exemplary structures which may be used for implementing the above concepts in a second transmission node 91 of a radio communication system, e.g., a cellular radio network based on the LTE technology. The second transmission node 91 may for example correspond to an eNB or to some other type of base station.

As illustrated, the second transmission node 91 may include a radio interface 92 for enabling access of one or more radio devices, such as the above-mentioned wireless communication device. The radio interface may for example implement the Uu radio interface of the LTE radio technology. As further illustrated, the second transmission node may include a network interface 93 for connecting the second transmission node 91 to other nodes of the cellular radio network, e.g., to other the first transmission node 81 or to nodes of a core network part of the cellular radio network. The network interface 93 may for example implement the X2 and/or S1 interface of the LTE technology.

Further, the second transmission node 91 may include one or more processors 95 coupled to the radio interface and network interface, and a memory 95 coupled to the processor(s). The memory may include a ROM, e.g., a flash ROM, a RAM, e.g., a DRAM or SRAM, a mass storage, e.g., a hard disk or solid state disk, or the like. The memory 95 includes suitably configured program code to be executed by the processor(s) so as to implement the above-described functionalities of an access node. In particular, the memory may include various program code modules for causing the first transmission node to perform processes as described above.

As illustrated, the memory may include a module 96 for selecting a MCS, wherein the MCS is to be employed for transmission via the radio interface of the second transmission node. Further, the memory may include a module 97 for communicating a transmission decision. The transmission decision may include information indicating the MCS selected by the second transmission node or other kind of information such as RI, precoding matrix etc. as mentioned in the above. Communication of any one of the transmission decisions may be performed via said interface to the first transmission node.

It is to be understood that the structures as illustrated in FIG. 9 are merely schematic and that the second transmission node 91 may actually include further components which, for the sake of clarity, have not been illustrated, e.g., further interfaces or processors. Also, it is to be understood that the memory 95 may include further types of program code modules, which have not been illustrated, e.g., program code modules for implementing known functionalities of an eNB or similar access node. According to some embodiments, also a computer program may be provided for implementing functionalities of the second transmission node 730, e.g., in the form of a physical medium storing the program code and/or other data to be stored in the memory or by making the program code available for download or by streaming.

Figure 10:
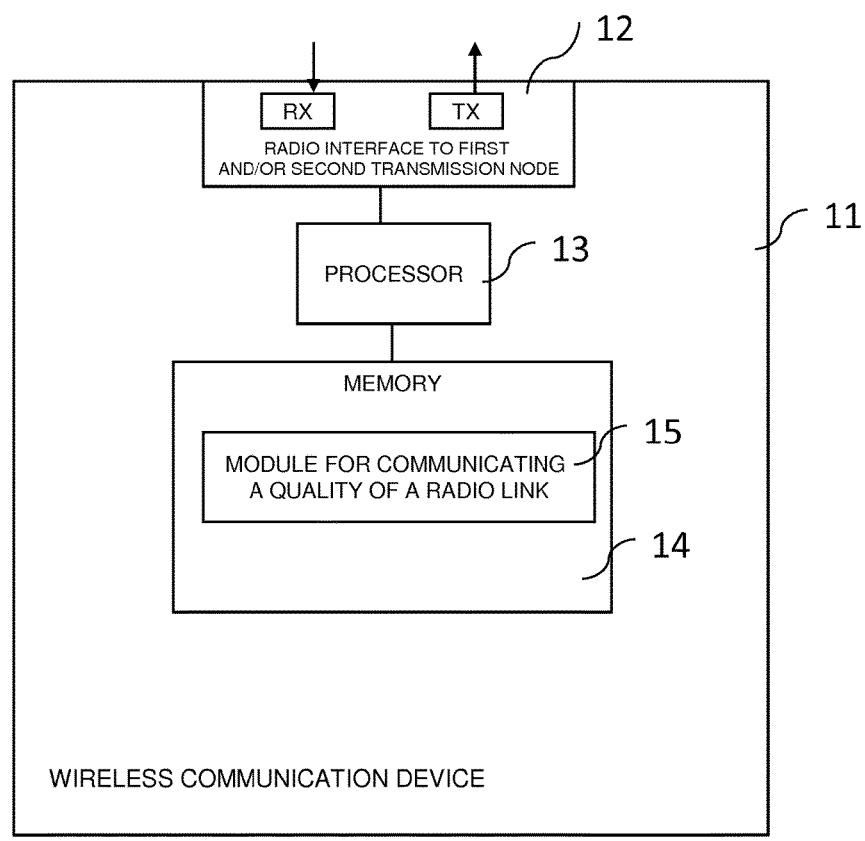
FIG. 10 schematically illustrates exemplary structures of a wireless communication device according to an embodiment of the invention.

FIG. 10 illustrates exemplary structures which may be used for implementing the above concepts in a wireless communication device 11, such as wireless communication device 104, 720. The wireless communication device may for example correspond to (mobile) terminal such as a mobile phone or to some other type of user equipment (UE).

As illustrated, the wireless communication device may include a radio interface 12 for enabling access of the wireless communication device to a radio communication system, e.g., a cellular radio network based on the LTE technology. The wireless communication device may for example implement the Uu radio interface of the LTE radio technology.

Further, the wireless communication device 11 may include one or more processors coupled to the radio interface 12, and a memory 14 coupled to the processor(s) 13. The memory 14 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory includes suitably configured program code to be executed by the processor(s) so as to implement the above-described functionalities of a wireless communication device 11. In particular, the memory may include various program code modules for causing the radio device to perform processes as described above, e.g., corresponding to one or more of the method steps in the above.

As illustrated, the memory may include a module 15 for communicating a quality of a radio link, such as explained in connection with step 204 of FIG. 2.

It is to be understood that the structures as illustrated in FIG. 10 are merely schematic and that the wireless communication device wireless communication device 11 may actually include further components which, for the sake of clarity, have not been illustrated, e.g., further interfaces or processors. Also, it is to be understood that the memory 14 may include further types of program code modules, which have not been illustrated, e.g., program code modules for implementing known functionalities of a wireless communication device, such as a UE or similar radio device. According to some embodiments, also a computer program may be provided for implementing functionalities of the wireless communication device, e.g., in the form of a physical medium storing the program code and/or other data to be stored in the memory or by making the program code available for download or by streaming.

It is to be understood that the examples and embodiments as explained above are merely illustrative and susceptible to various modifications. For example, the illustrated concepts may be applied in connection with various cellular radio network technologies. Further, other characteristics of traffic generated by an application could be considered in addition or as an alternative. Moreover, it is to be understood that the above concepts may be implemented by using correspondingly designed software to be executed by one or more processors of an existing device, or by using dedicated device hardware.

The invention claimed is:

1. A method for performing link adaptation of a radio link, the method comprising a transmission node:
   determining an estimation error of an estimated quality of the radio link;
   determining a time limit for which the estimated quality of the radio link is valid, and
      determining the estimation error and/or adapting a Modulation and Coding Scheme (MCS) decision input value if the time limit has elapsed;
   determining whether a rank indicator of the transmission node and/or a neighboring transmission node has changed, compared to a rank indicator for which the quality of the radio link has been estimated;
   determining the estimation error and/or adapting the MCS decision input value if the rank indicator has changed;
   adapting the MCS decision input value, which is based on the estimated quality of the radio link, by increasing the MCS decision input value if the determined estimation error exceeds a predetermined threshold;
   using a Hybrid Automatic Repeat Request (HARQ) transmission for throughput loss for an aggressive MCS caused by increasing the MCS decision input value if the determined estimation error exceeds a predetermined threshold; and
   selecting a MCS based on the MCS input value as adapted.

2. The method of claim 1, wherein adapting the MCS decision input value comprises adding an offset to the MCS decision input value.

3. The method of claim 1, wherein determining an estimation error of the estimated quality of the radio link comprises:
   estimating a Signal-to-Interference-and-Noise-Ratio (SINR) of the radio link; and
   determining an estimation error level of the estimated SINR.

4. The method of claim 1, wherein adapting the MCS decision input value comprises adding an offset having a predetermined constant value.

5. The method of claim 1, wherein adapting the MCS decision input value comprises adding an offset having a value adapted based on the determined estimation error.

6. The method of claim 1, wherein the adapting the MCS decision input value comprises adding an offset which is large enough such that a more aggressive MCS is selected than if the MCS is based on the estimated quality of the radio link.

7. The method of claim 1, further comprising selecting a MCS corresponding to the MCS decision input value based on the estimated quality of the radio link if the determined estimation error is below a first predetermined threshold.

8. The method of claim 1, further comprising determining an estimated quality of the radio link based on a transmission decision of at least one neighboring transmission node.

9. The method of claim 1, further comprising determining an estimation error of the radio link quality based on a transmission decision of a neighboring transmission node.

10. The method of claim 1, further comprising determining an estimation error of the radio link quality based on:
    a Channel Quality Indicators (CQI);
    a channel state information (CSI) process;
    a Precoding Matrix Indicator (PMI);
    a Rank Indicator (RI); and/or
    receiver capabilities.

11. The method of claim 1, further comprising determining an estimation error of the radio link quality based on comparing a plurality of Channel Quality Indicators (CQI), which are created based on the same transmission hypothesis.

12. The method of claim 1, further comprising:
    determining whether a number of interferers has changed compared to a number of interferers of the estimated quality of the radio link has been estimated; and
    determining the estimation error and/or adapting the MCS decision input value if the number of interferers has changed.

13. The method of claim 1, further comprising:
    determining whether the power of interference has changed compared to a power of interference for which the quality of the radio link has been determined; and
    determining the estimation error and/or adapting the MCS decision input value if the power of interference has changed above a predetermined threshold.

14. The method of claim 1, further comprising:
determining whether a precoding matrix indicator of the transmission node and/or a neighboring transmission node has changed compared to a precoding matrix indicator for which the quality of the radio link has been estimated;
and determining the estimation error and/or adapting the MCS decision input value if the precoding matrix indicator has changed.

15. The method of claim 1, wherein determining the estimation error, and/or the selecting the MCS is performed for each one of a plurality of successive transmission time intervals or a set of transmission time intervals.

16. A transmission node for performing link adaptation of a radio link, the transmission node comprising:
processing circuitry;
memory containing instructions executable by the processing circuitry whereby the transmission node is operative to:
determine an estimation error of an estimated quality of the radio link;
determine a time limit for which the estimated quality of the radio link is valid, and determining the estimation error and/or adapting a Modulation and Coding Scheme (MCS) decision input value if the time limit has elapsed;
determine whether a rank indicator of the transmission node and/or a neighboring transmission node has changed, compared to a rank indicator for which the quality of the radio link has been estimated;
determine the estimation error and/or adapting the MCS decision input value if the rank indicator has changed;
adapt the MCS decision input value, which is based on the estimated quality of the radio link, by increasing the MCS decision input value if the determined estimation error exceeds a predetermined threshold;
use a Hybrid Automatic Repeat Request (HARQ) transmission for throughput loss for an aggressive MCS caused by increasing the MCS decision input value if the determined estimation error exceeds a predetermined threshold; and
select a MCS based on the MCS input value as adapted.

17. A non-transitory computer readable recording medium storing a computer program product for controlling link adaptation of a radio link, the computer program product comprising software instructions which, when run on processing circuitry of a transmission node, causes the transmission node to:
determine an estimation error of an estimated quality of the radio link;
determine a time limit for which the estimated quality of the radio link is valid, and determining the estimation error and/or adapting a Modulation and Coding Scheme (MCS) decision input value if the time limit has elapsed;
determine whether a rank indicator of the transmission node and/or a neighboring transmission node has changed, compared to a rank indicator for which the quality of the radio link has been estimated;
determine the estimation error and/or adapting the MCS decision input value if the rank indicator has changed;
adapt the MCS decision input value, which is based on the estimated quality of the radio link, by increasing the MCS decision input value if the determined estimation error exceeds a predetermined threshold;
use a Hybrid Automatic Repeat Request (HARQ) transmission for throughput loss for an aggressive MCS caused by increasing the MCS decision input value if the determined estimation error exceeds a predetermined threshold; and
select a MCS based on the MCS input value as adapted.

* * * * *